United States Patent
Yoshida et al.

(10) Patent No.: US 6,833,175 B2
(45) Date of Patent: Dec. 21, 2004

(54) GLASS SUBSTRATE FOR MAGNETIC RECORDING MEDIUM, AND MAGNETIC RECORDING MEDIUM

(75) Inventors: Susumu Yoshida, Kawasaki (JP); Hideyuki Akimoto, Kawasaki (JP); Masaya Suzuki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/097,152

(22) Filed: Mar. 13, 2002

(65) Prior Publication Data

US 2003/0039862 A1 Feb. 27, 2003

(30) Foreign Application Priority Data

Aug. 23, 2001 (JP) ........................................ 2001-252217

(51) Int. Cl.$^7$ ................................................. G11B 5/82
(52) U.S. Cl. ........................ 428/141; 428/426; 428/432; 428/65.3; 428/65.5; 428/65.7; 428/694 SG
(58) Field of Search .................................. 428/141, 426, 428/432, 65.3, 65.5, 65.7, 694 SG

(56) References Cited

U.S. PATENT DOCUMENTS

| | | | | |
|---|---|---|---|---|
| 5,815,343 A | * | 9/1998 | Ishikawa et al. | 360/97.01 |
| 5,868,953 A | * | 2/1999 | Maekawa et al. | 216/89 |
| 5,871,621 A | * | 2/1999 | Ross | 204/192.2 |
| 5,980,997 A | * | 11/1999 | Ross et al. | 427/555 |
| 6,509,108 B2 | * | 1/2003 | Okuyama et al. | 428/661 |

FOREIGN PATENT DOCUMENTS

JP 11-219511 8/1999

* cited by examiner

Primary Examiner—Stevan A. Resan
(74) Attorney, Agent, or Firm—Greer, Burns & Crain, Ltd.

(57) ABSTRACT

A glass substrate for a magnetic recording medium has a textured surface having numerous grooves extending in the circumferential direction of the glass substrate. The average roughness of the textured surface is 0.4 nm or less. The number of the grooves is 15 or more per micrometer. The average depth of the grooves is 2 nm or less. The grooves are formed by mechanical texturing using a texturing liquid applied between a texturing tape and the surface of a blank glass substrate rotating. The texturing liquid is an aqueous dispersion of fine diamond abrasive grains.

6 Claims, 4 Drawing Sheets

10 μm

1 μm

GLASS SUBSTRATE FOR MAGNETIC RECORDING MEDIUM, AND MAGNETIC RECORDING MEDIUM

BACKGROUND OF THE INVENTION

1. Field of the Invention

The present invention relates to a glass substrate for a magnetic recording medium, and also to a magnetic recording medium using the glass substrate.

2. Description of the Related Art

As a substrate material for a magnetic disk, an aluminum alloy substrate well workable has long been used mainly. However, in a 2.5-inch magnetic disk drive built in a portable personal computer such as a notebook personal computer, there has recently been a tendency to use a strong glass substrate formed of tempered glass or crystallized glass, for example, with the main objective of reduction in size of magnetic particles, improvement in magnetic anisotropy, and prevention of stiction of a magnetic head in response to the recent demands for high-density recording and low flying height of the magnetic head, a NiP layer is formed on the glass substrate by sputtering and thereafter mechanical texturing is applied to the NiP layer.

Thus, in the case of using a glass substrate as the substrate, a NiP layer formed on the glass substrate is generally subjected to texturing. However, in performing the texturing after forming the NiP layer, the glass substrate must be once removed from a chamber of a sputtering device prior to texturing. Further, after texturing, the glass substrate must be returned into the chamber. As a result, a manufacturing cost of a magnetic disk using this glass substrate is increased. Accordingly, a magnetic disk with a magnetic film or the like formed on an untextured glass substrate is also commercially available.

SUMMARY OF THE INVENTION

It is therefore an object of the present invention to provide a glass substrate for a magnetic recording medium which can reduce the size of magnetic particles to thereby improve the S/N of a reproducing signal.

It is another object of the present invention to provide a magnetic recording medium using a glass substrate which can improve the S/N of a reproducing signal.

In accordance with an aspect of the present invention, there is provided a glass substrate for a magnetic recording medium, comprising a textured surface having numerous grooves extending in the circumferential direction of the glass substrate; the average roughness of the textured surface being 0.4 nm or less; the number of the grooves being 15 or more per micrometer; the average depth of the grooves being 2 nm or less.

Preferably, the grooves are formed by mechanical texturing using a texturing liquid applied between a texturing tape and the surface of a blank glass substrate rotating, the texturing liquid being an aqueous dispersion of abrasive grains.

In accordance with another aspect of the present invention, there is provided a magnetic recording medium comprising a glass substrate having a textured surface having numerous grooves extending in the circumferential direction of the glass substrate, the average roughness of the textured surface being 0.4 nm or less, the number of the grooves being 15 or more per micrometer, the average depth of the grooves being 2 nm or less; a nonmagnetic metal layer formed on the glass substrate; a base layer formed on the nonmagnetic metal layer; an intermediate layer formed on the base layer; a Co alloy magnetic layer formed on the intermediate layer; and a protective film formed on the Co alloy magnetic layer.

Preferably, the magnetic recording medium further includes a Cr adhering layer interposed between the glass substrate and the nonmagnetic metal layer, and the nonmagnetic metal layer includes a NiP layer. Preferably, the total film thickness of the Cr adhering layer and the nonmagnetic metal layer is 50 nm or less. A metal layer may be embedded in the glass substrate.

In accordance with a further aspect of the present invention, there is provided a manufacturing method for a magnetic recording medium including a glass substrate having a textured surface having numerous grooves extending in the circumferential direction of the glass substrate, the average roughness of the textured surface being 0.4 nm or less, the number of the grooves being 15 or more per micrometer, the average depth of the grooves being 2 nm or less, the manufacturing method comprising the steps of forming a NiP layer on the glass substrate; oxidizing the NiP layer; forming a base layer containing Cr as a main component on the NiP layer oxidized; forming an intermediate layer on the base layer; forming a Co alloy magnetic layer on the intermediate layer; and forming a protective film on the Co alloy magnetic layer.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
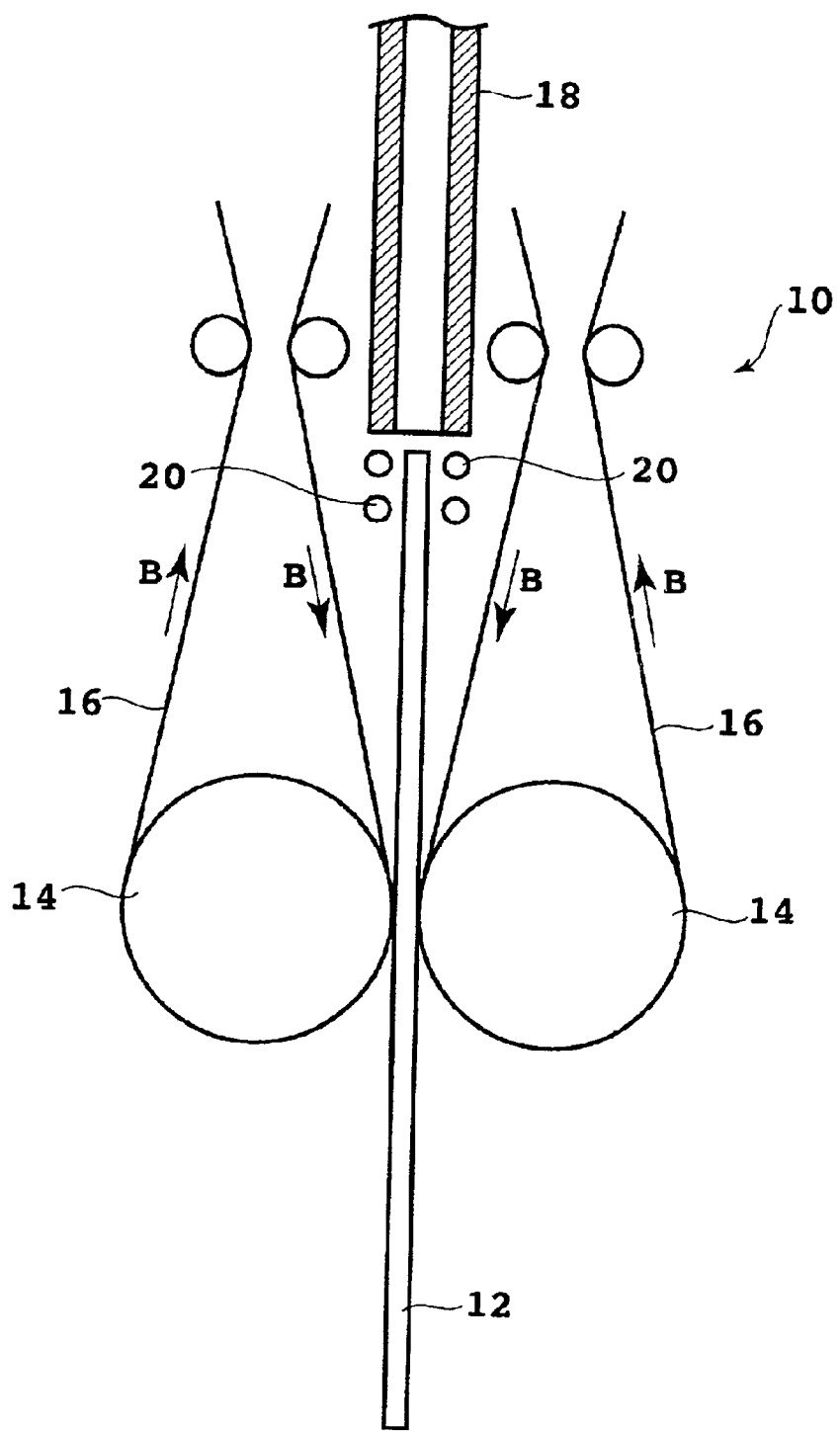
FIG. 1 is an elevational view of a texturing device.
Figure 2:
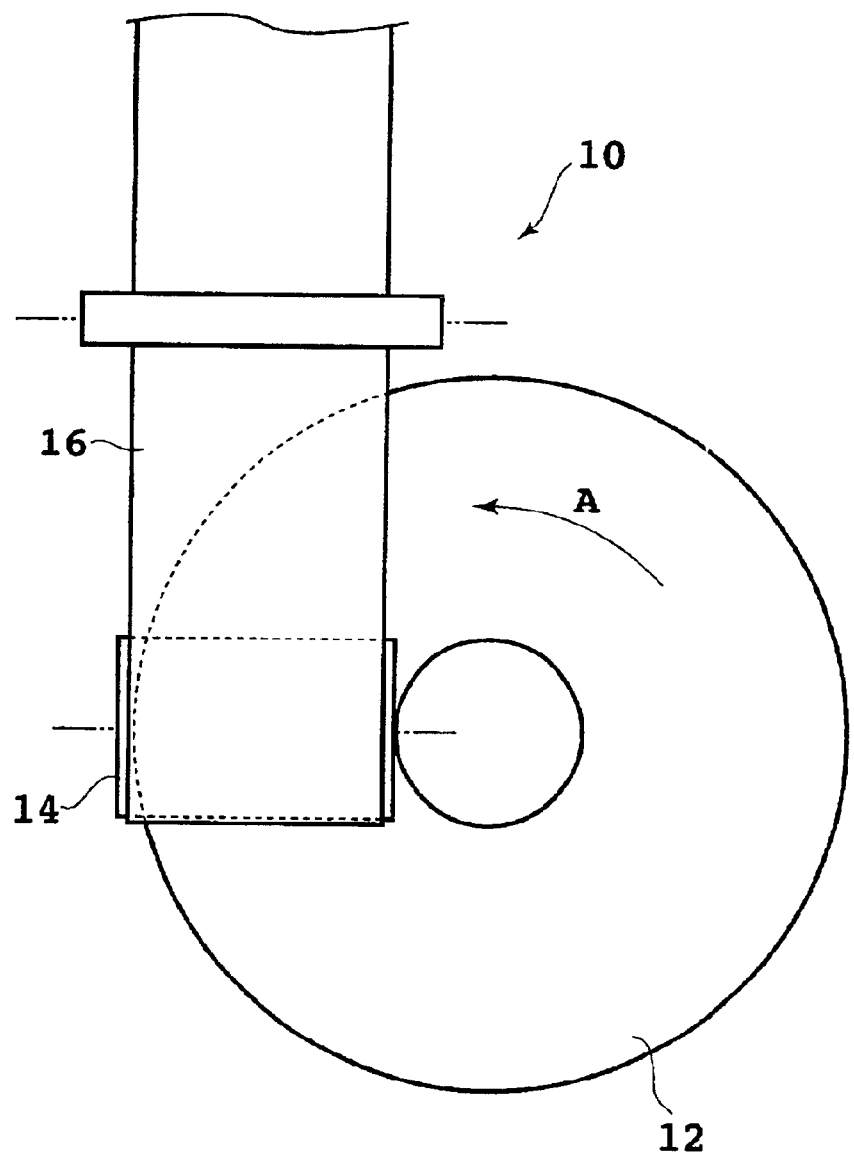
FIG. 2 is a side view of the texturing device.

Referring to FIG. 1, there is shown an elevational view of a texturing device 10 for texturing the surface of a glass substrate. FIG. 2 is a left side view of FIG. 1. Reference numeral 12 denotes a disk-shaped glass substrate, which is formed of tempered glass or crystallized glass, for example, having a sufficient strength. The texturing device 10 has a pair of contact rollers 14 located on the opposite sides of the glass substrate 12, a pair of texturing tapes 16 wrapped around the pair of contact rollers 14, respectively, and a texturing liquid supplying unit 18 for supplying a texturing liquid 20. The texturing liquid 20 is an aqueous dispersion of fine diamond abrasive grains or the like. Each diamond abrasive grain has a diameter of about 0.02 to 1 $\mu$m. Other abrasive grains like CBN grains may be employed.

Both surfaces of the glass substrate 12 are textured by applying drops of the texturing liquid 20 from the texturing liquid supplying unit 18 onto both surfaces of the glass substrate 12, and simultaneously rotating the glass substrate 12 in the direction shown by the arrow A in FIG. 2 and rotating the texturing tapes 16 in the direction shown by the arrows B in FIG. 1. As a result, numerous grooves are formed on both surfaces of the glass substrate 12 so as to extend in the circumferential direction of the glass substrate 12. To support a low flying height of a magnetic head, each textured surface of the glass substrate 12 must have an average roughness (Ra) of 0.4 nm or less, and the average depth of the grooves formed on each textured surface of the glass substrate 12 must be suppressed to 2 nm or less. Furthermore, to achieve a sufficiently small size of magnetic particles, the number of the grooves must be set to 15 or more per micrometer, preferably 30 or more per micrometer.

Figure 3A:
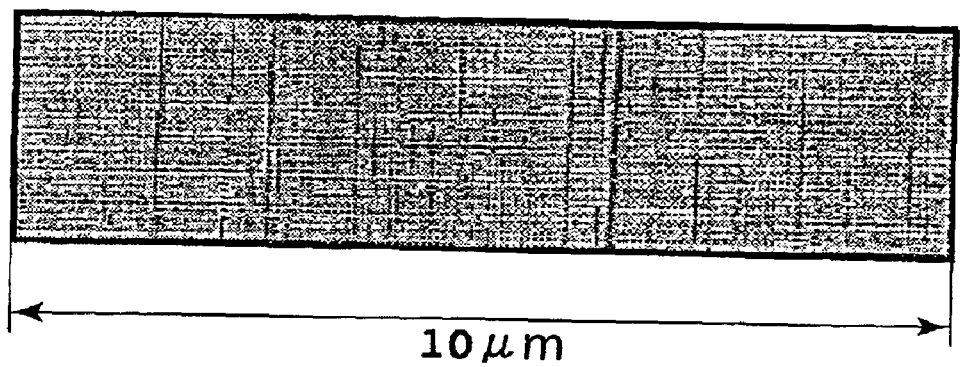
FIGS. 3A and 3B are photographic views showing images observed by an atomic force microscope.
Figure 3B:
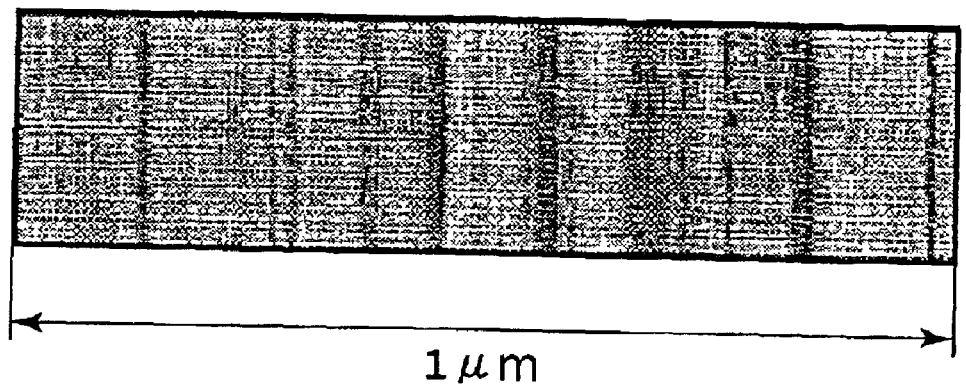

The average roughness (Ra) of each textured surface of the glass substrate 12 is determined by using an atomic force microscope (AFM) to measure the roughness in an area of 10 μm×10 μm and calculate the average of measured values of the roughness. The number of the grooves is defined as a count value of valleys measured on the cross section in an area of 1 μm×1 μm by using the AFM. The average depth of the grooves is determined by calculating the average of the depths of the above valleys. FIGS. 3A and 3B show images of each textured surface of the glass substrate 12 observed by using the AFM. FIG. 3A shows the image observed under a relatively low magnification, and FIG. 3B shows the image observed under a relatively high magnification. As apparent from the magnified images shown in FIGS. 3A and 3B, numerous grooves are formed on each textured surface of the glass substrate 12 so as to extend in the circumferential direction of the glass substrate 12.

Figure 4:
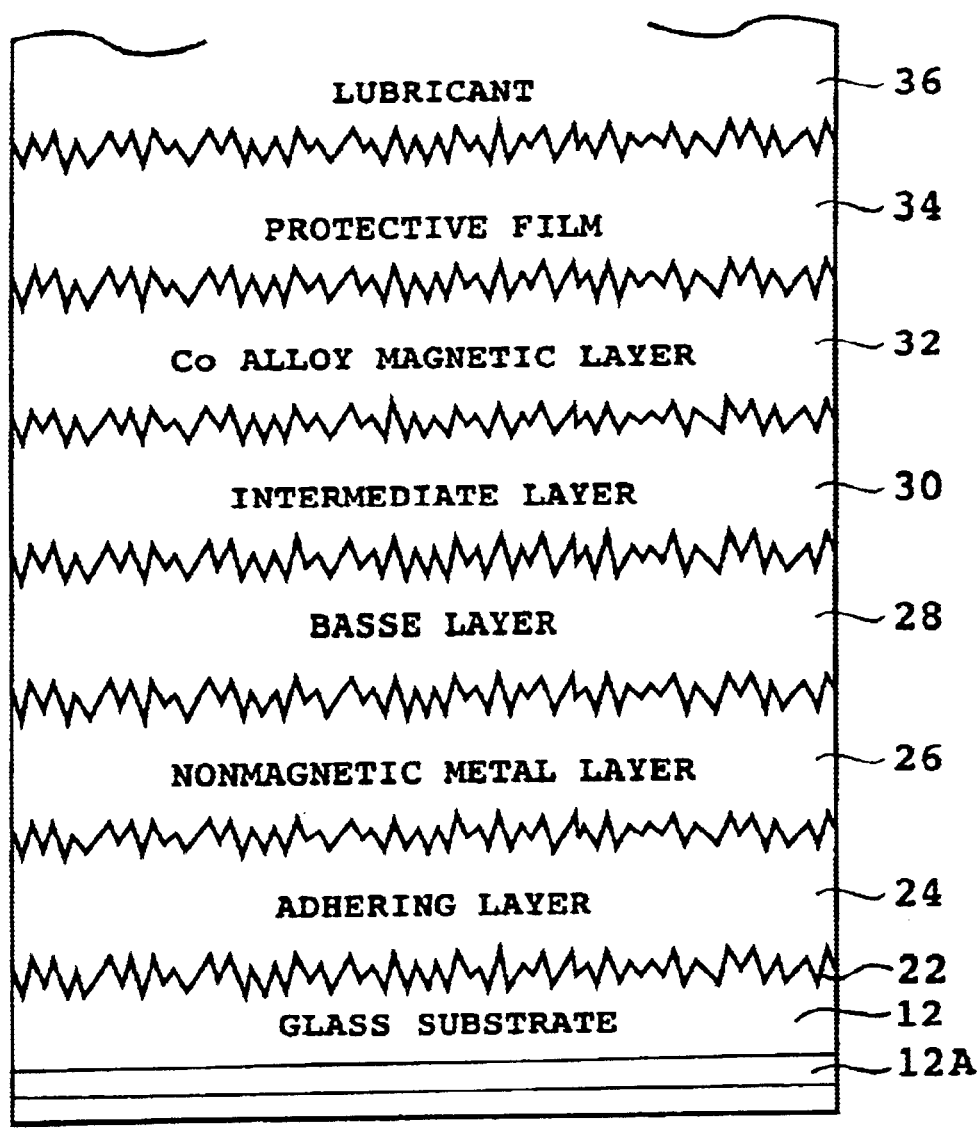
FIG. 4 is a schematic sectional view of a magnetic recording medium according to a preferred embodiment of the present invention.

Referring to FIG. 4, there is shown a schematic sectional view of a magnetic recording medium according to a preferred embodiment of the present invention. A plurality of circumferentially extending grooves 22 are formed on the textured surface of the glass substrate 12. An adhering layer 24 of Cr, for example, is formed on the textured surface of the glass substrate 12, and a nonmagnetic metal layer 26 of NiP, for example, is formed on the adhering layer 24. The formation of the adhering layer 24 and the nonmagnetic metal layer 26 is performed in a chamber of a sputtering device. Unless the nonmagnetic metal layer 26 is formed, the temperature of the glass substrate 12 rapidly decreases in subsequently forming a base layer, magnetic layer, etc. thereon. Therefore, the nonmagnetic metal layer 26 is essential. Optionally, a metal layer 12A of Al, Cu, etc. may be preliminarily embedded in the glass substrate 12 to suppress the temperature decrease of the glass substrate 12.

The total film thickness of the adhering layer 24 and the nonmagnetic metal layer 26 is set to 50 nm or less, preferably 2 to 30 nm. In this preferred embodiment, the total film thickness of the layers 24 and 26 is 30 nm. Thereafter, the nonmagnetic metal layer 26 is oxidized. The oxidation of the nonmagnetic metal layer 26 is preferably performed by passing oxygen in the chamber of the sputtering device. A base layer 28 composed of a single or multiple layers is formed on the oxidized nonmagnetic metal layer 26. The base layer 28 is mainly formed of Cr. Preferably, the base layer 28 is formed of alloy containing Cr as a main component and also containing Mo, W, and Ti.

An intermediate layer 30 is formed on the base layer 28, and a Co alloy magnetic layer 32 composed of a single or multiple layers is formed on the intermediate layer 30. In the case that the Co alloy magnetic layer 32 is composed of multiple layers, a Ru layer as an exchange bonding layer may be inserted between the multiple layers. A protective film 34 is formed on the Co alloy magnetic layer 32. The protective film 34 functions to prevent wear and corrosion of the Co alloy magnetic layer 32. A lubricant 36 is applied to the protective film 34. In the measurement to this magnetic recording medium by the AFM, the average roughness (Ra) of the glass substrate 12 was 0.37 nm; the number of the grooves was 26 per micrometer; and the average depth of the grooves was 0.6 nm.

To confirm the effect of the magnetic recording medium according to this preferred embodiment, a magnetic recording medium having a glass substrate with no grooves was produced as a comparison. That is, a Cr adhering layer, NiP layer, base layer, intermediate layer, Co alloy magnetic layer, and protective film are sequentially formed on the untextured surface of a glass substrate having no circumferential grooves to produce a magnetic recording medium as a comparison. In the magnetic recording medium of the present invention, it was confirmed that the size of magnetic particles forming the Co alloy magnetic layer 32 was smaller by 9% than that of the comparison. As a result, the S/N of a reproducing signal was increased by 0.6 dB over the comparison.

According to the glass substrate for the magnetic recording medium of the present invention as described above, it is possible to reduce the size of magnetic particles and thereby improve the S/N of a reproducing signal.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A glass substrate for a magnetic recording medium, comprising:

a textured surface having numerous grooves extending in the circumferential direction of said glass substrate;

the average roughness of said textured surface being 0.4 nm or less;

the number of said grooves being 15 or more per micrometer;

the average depth of said grooves being 2 nm or less;

said grooves being formed directly on the glass substrate by mechanical texturing using a texturing liquid applied between a texturing tape and the surface of a rotating blank glass substrate, said texturing liquid being an aqueous dispersion of abrasive grains; and further including a metal layer embedded in said glass substrate.

2. A magnetic recording medium comprising:

a glass substrate having a textured surface having numerous grooves extending in the circumferential direction of said glass substrate, the average roughness of said textured surface being 0.4 nm or less, the number of said grooves being 15 or more per micrometer, the average depth of said grooves being 2 nm or less;

said grooves being formed directly on the glass substrate by mechanical texturing using a texturing liquid applied between a texturing tape and the surface of a rotating blank glass substrate, said texturing liquid being an aqueous dispersion of abrasive grains;

a nonmagnetic metal layer formed on said glass substrate;

a base layer formed on said nonmagnetic metal layer;

an intermediate layer formed on said base layer;

a Co alloy magnetic layer formed on said intermediate layer; and a protective film formed on said Co alloy magnetic layer; and further including a metal layer embedded in said glass substrate.

3. A magnetic recording medium according to claim 2, further comprising a Cr adhering layer interposed between said glass substrate and said nonmagnetic metal layer.

4. A magnetic recording medium according to claim 3, wherein the total film thickness of said Cr adhering layer and said nonmagnetic metal layer is 50 nm or less.

5. A magnetic recording medium according to claim 2, wherein said nonmagnetic metal layer comprises a NiP layer.

6. A magnetic recording medium according to claim 2, wherein said base layer is formed of alloy containing Cr as a main component and also containing Mo, W, and Ti.

* * * * *